April 6, 1948. H. N. SEYFERTH 2,439,106
GRINDING MACHINE FOR OPERATING UPON WORKPIECES
Filed Oct. 2, 1943 6 Sheets-Sheet 1

INVENTOR.
Harold N. Seyferth
BY
ATTORNEY.

April 6, 1948. H. N. SEYFERTH 2,439,106
GRINDING MACHINE FOR OPERATING UPON WORKPIECES
Filed Oct. 2, 1943 6 Sheets-Sheet 4
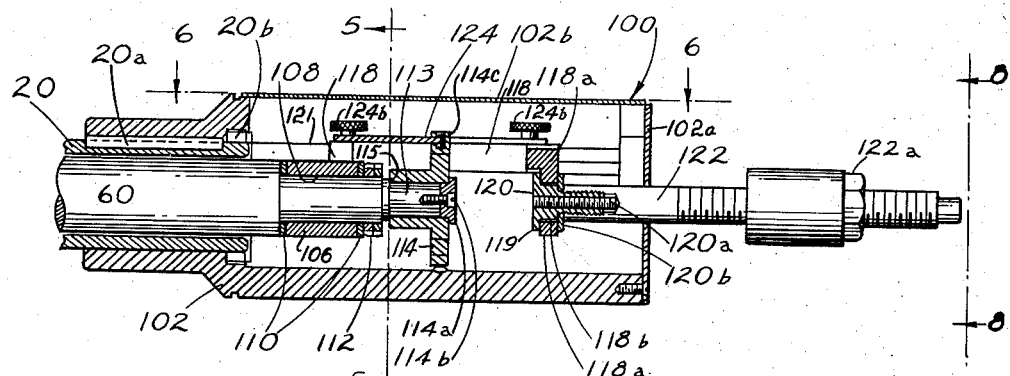
Fig. 4
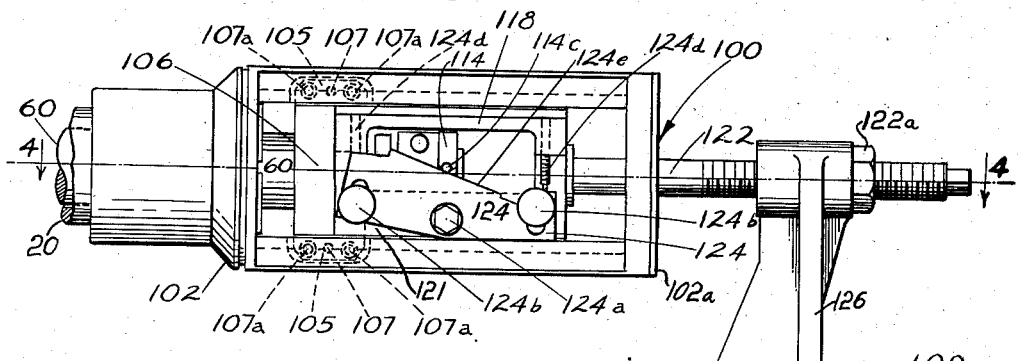
Fig. 6
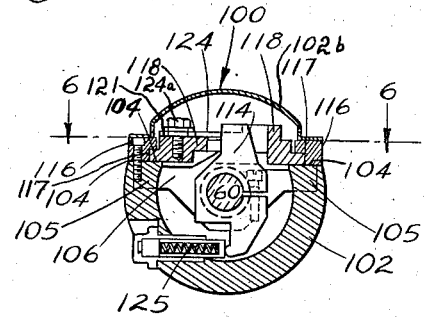
Fig. 7
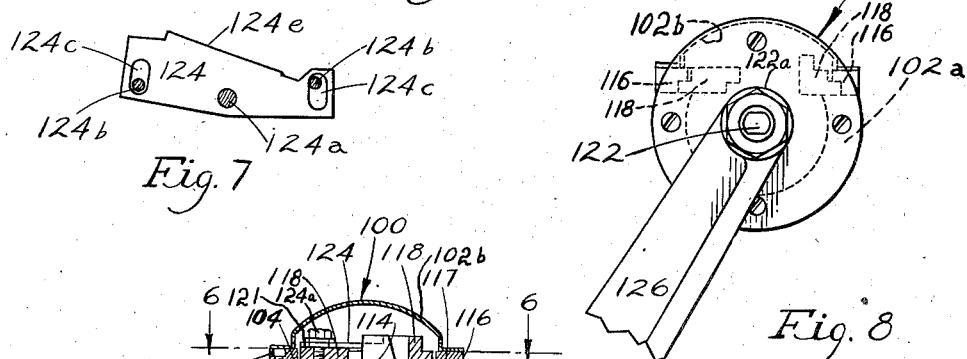
Fig. 8
Fig. 5
INVENTOR.
Harold N. Seyferth
BY
ATTORNEY.

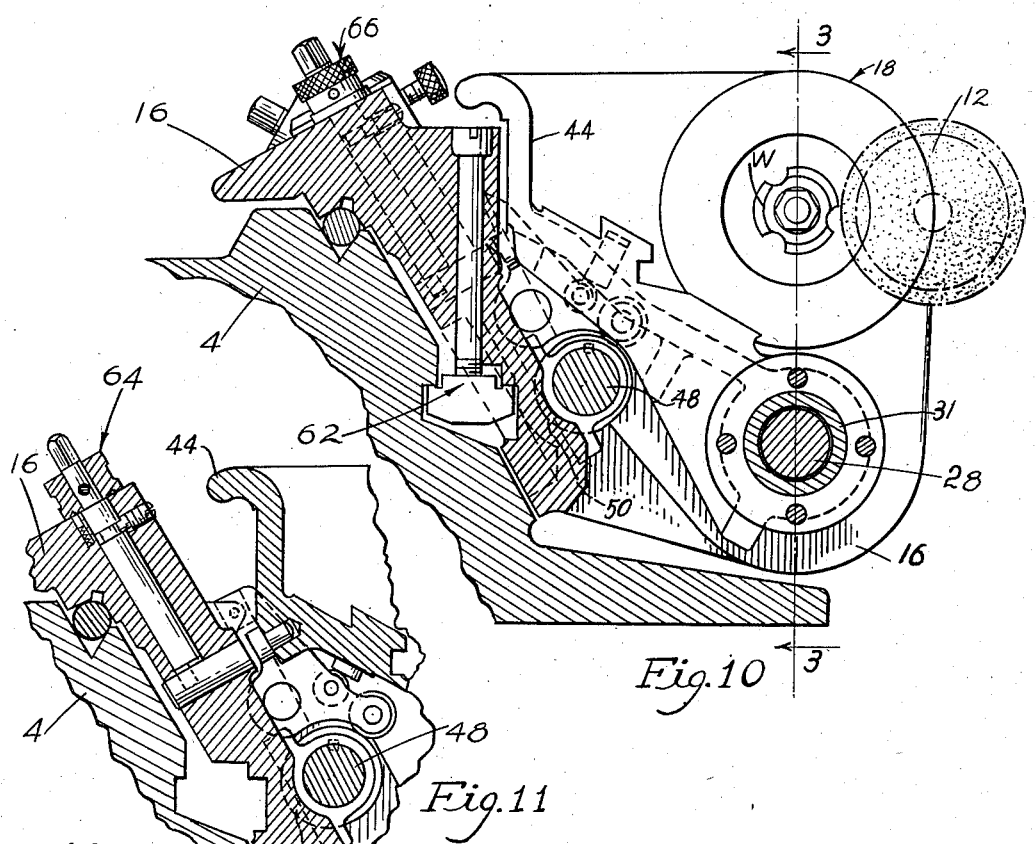
Fig. 10
Fig. 11
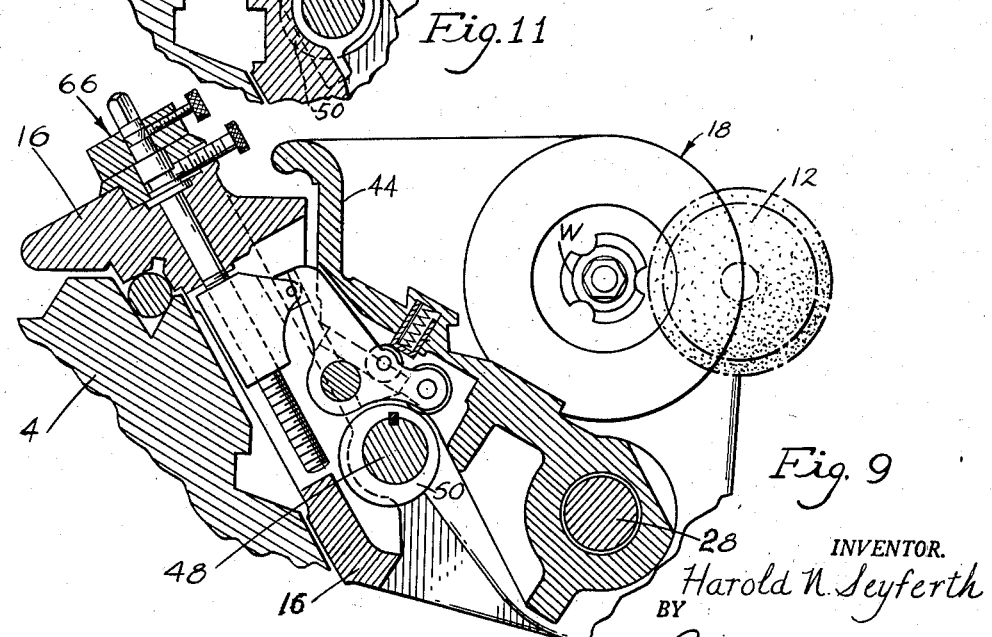
Fig. 9

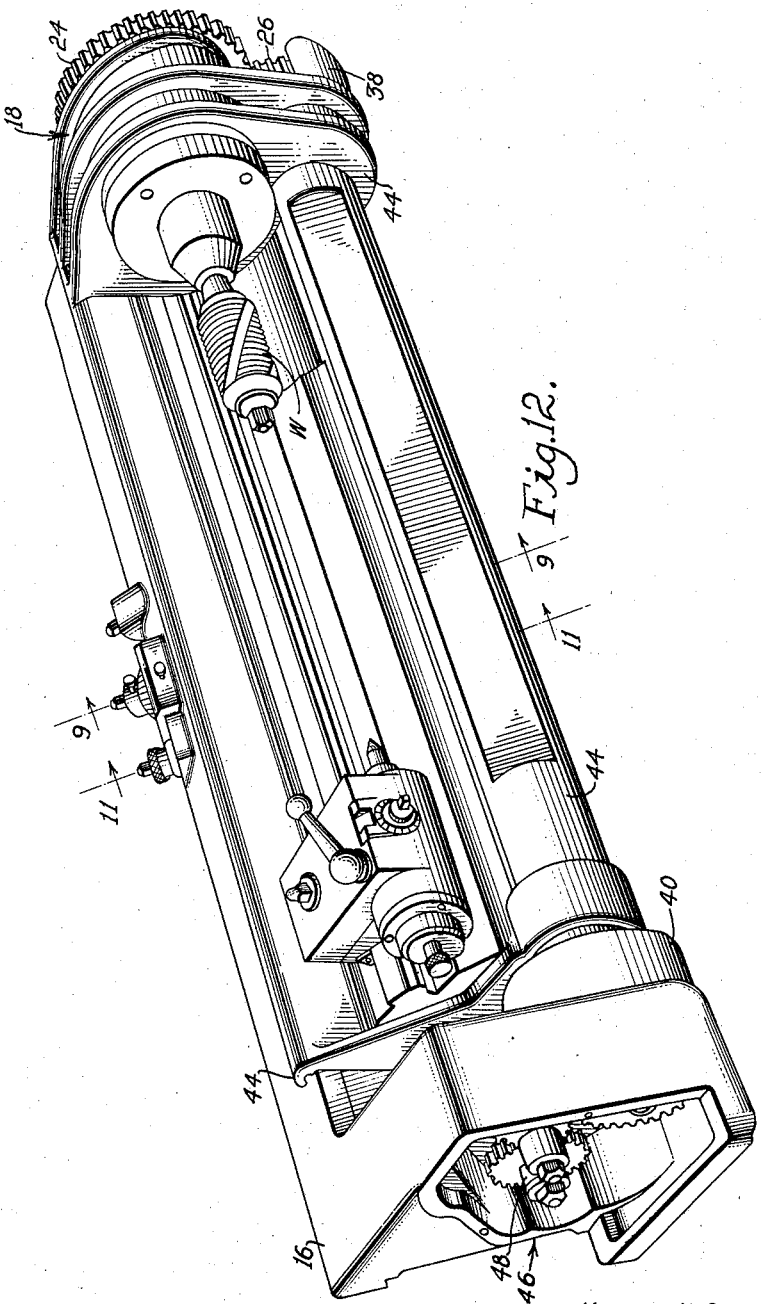

Patented Apr. 6, 1948

2,439,106

UNITED STATES PATENT OFFICE 2,439,106

GRINDING MACHINE FOR OPERATING UPON WORKPIECES

Harold N. Seyferth, East Detroit, Mich., assignor to Ex-Cell-O Corporation, Detroit, Mich., a corporation of Michigan Application October 2, 1943, Serial No. 504,689

6 Claims. (Cl. 51—95)

This invention relates generally to improvements in grinding machines for operating upon workpieces, and has utility as an adjunct to a grinding machine in grinding of thread milling hobs and the like. The cutting teeth of such hobs have their cutting edges faced respectively upon the leading edge of a multiplicity of associated spiral chip clearance gashes equally spaced around the periphery of the hob. The relieved trailing portions of the respective teeth end in the adjacent spiral gash which trails the cutting edges of the teeth. The angle of these spiral gashes, made with an element of the generally cylindrical peripheral surface of the hob, usually is from 3° to 10° respectively corresponding to helix angles of 87° to 80°.

When relieving thread milling hobs, the tool which cuts the relieved tooth surface contacts the hob at a greater radius from its axis of rotation when generating the cutting edge than at any relieved portion of the tooth which trails this portion of maximum radius. In the relieving of straight gashed thread milling hobs, the relieving tool (usually a rotating complementarily formed grinding wheel) describes an exactly and synchronously timed movement of reciprocation with respect to the rotation of the hob being relieved, the relieving tool making as many cycles of reciprocation as there are equally spaced gashes around the circumference of the hob. In the relieving of the teeth of spirally gashed hobs, the same timing of relieving movements of the tool must exist with respect to the teeth of each row taken along the leading spiral edge of the chip clearance gash of the hob. To accomplish this result there must be a predetermined change of timing between the rotation of the hob and the positioning of the relieving tool axially of the hob with each positioning of the grinding wheel along the hob axis, which timing change must be in accordance with the helix angle of the spiral gashes in the hob surface.

It is an object of the present invention to automatically accomplish the timing change between hob rotation and movement of the relieving means which is required by the departure of the spiral chip clearance gashes therein from true elements of the hob surface as the relieving tool is moved axially of the hob in relieving the various teeth along its length.

It is another object of the invention to provide a timing changing means for the purpose described in which the change in timing is adjustably controllable to meet the requirements for grinding spiral gashed hobs, taps and the like having gashes of various helix angles.

A still further object is the provision of a timing changing means which can be adjusted with facility to bring into coincidence the initial timing relations required between movements of axial separation between hob axis and grinding wheel axis as required in setting up the associated grinding machine to properly relieve the teeth of such cutting tools.

In the drawings:

Fig. 4 is an enlarged horizontal longitudinal sectional view through the timing control means and comprises a fragmentary section taken on line 4—4 of Fig. 6.

Fig. 5 is an enlarged cross sectional view through the housing of the phase changing means taken on line 5—5 of Fig. 4.

Fig. 6 is a view on line 6—6 of Fig. 5 with closure cover removed.

Fig. 7 is a detail view of the spiral control cam member of Fig. 6.

Fig. 8 is an end elevational view looking along line 8—8 of Fig. 4.

Fig. 9 is a fragmentary sectional view on lines 9—9 of Fig. 12;

Fig. 10 is a fragmentary sectional view on lines 10—10 of Fig. 3 with tailstock omitted for clarity;

Fig. 11 is a fragmentary sectional view on lines 11—11 of Fig. 12; and

Fig. 12 is a perspective view of the relieving means shown in association with the machine table 4 of Fig. 3.

Figure 1:
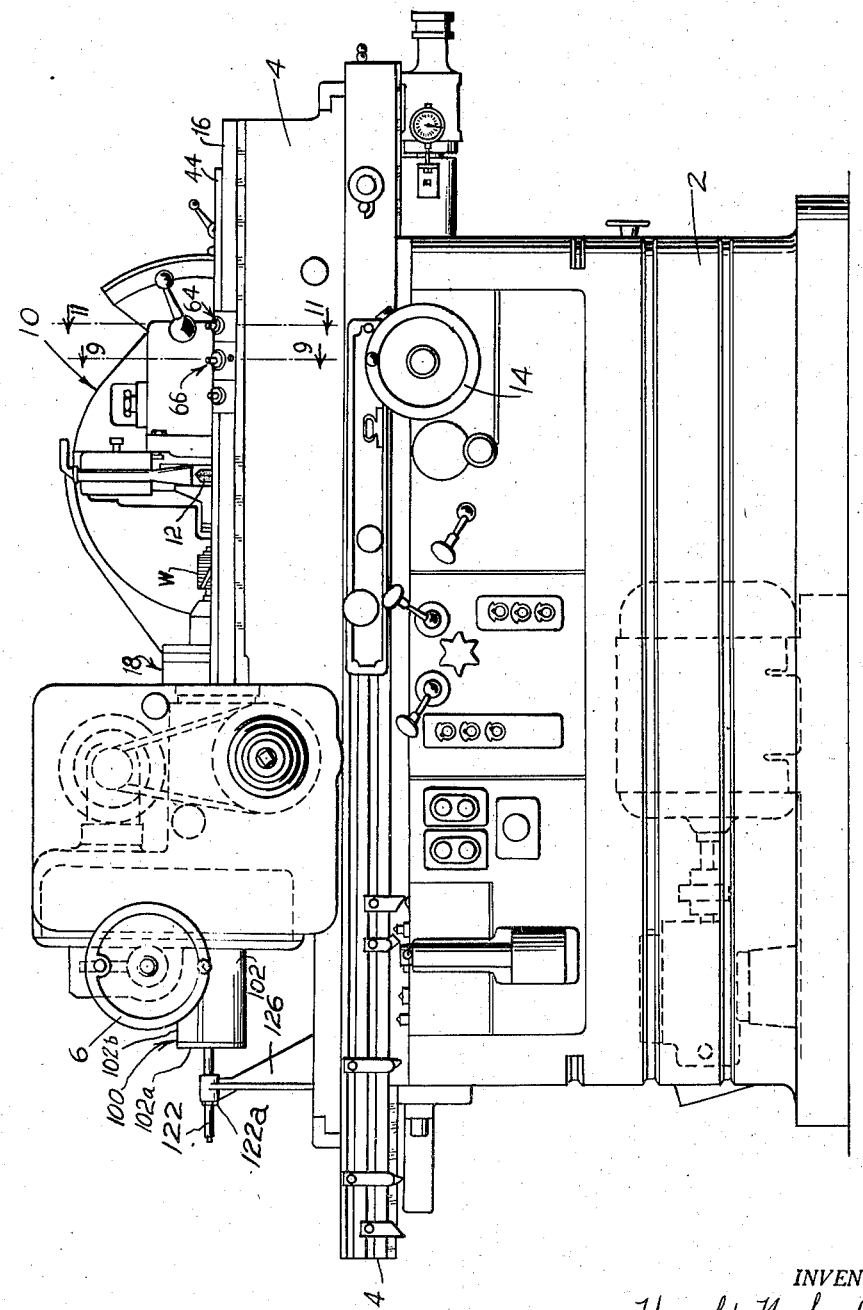
Fig. 1 is a front elevational view of a machine illustrating an embodiment of my invention.
Figure 2:
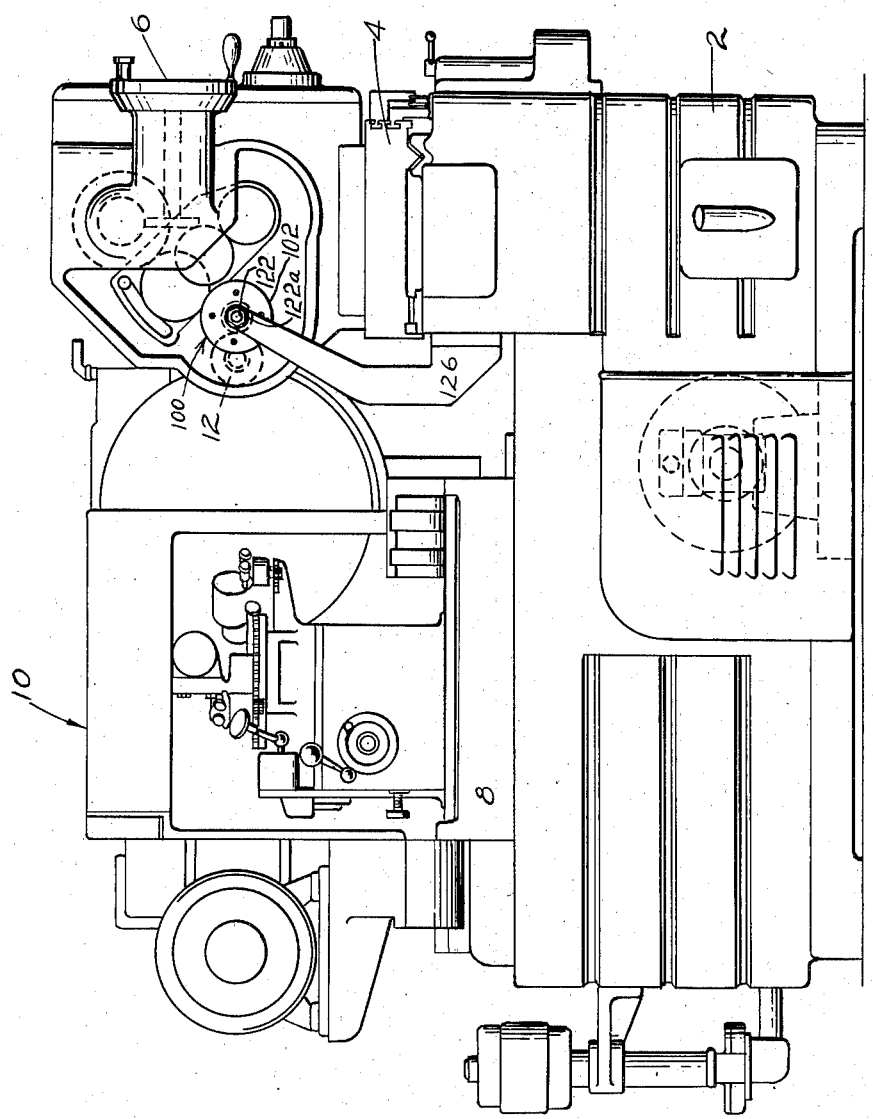
Fig. 2 is an end elevational view of the machine shown in Fig. 1.

Referring more particularly to the drawings; Fig. 1 shows a well know machine of which the principal structural features are described in United States Patent No. 2,251,961, issued August 12, 1941, to Ira J. Snader. As the present invention is susceptible to use with grinding machines of various constructions, it is sufficient to say that a machine suitable for use therewith includes a base 2, a table 4 slidable thereon longitudinally of the axis of the workpiece W in a step by step indexing movement which may be accomplished by any suitable means therefor, such as, manual rotation of the longitudinal feed wheel 6 through one turn, or a fraction or multiple thereof intermediate the grinding of successive teeth on the workpiece W as required by the pitch or axial spacing of the teeth along the workpiece.

Back of the table 4 and mounted on a cross slide 8 is a conventional belt or electric motor driven grinding wheel means 10 having a wheel 12 which is complementarily formed to grind into the periphery of the workpiece a groove or thread convolution of the desired shape. The cross slide 8 may be moved transversely of the axis of the work W by a work size control wheel 14. The wheel infeeding movements may be accomplished either automatically or manually as desired.

On table 4 is mounted an auxiliary table 16 provided with a rotatable and rockable work support 18. The purpose of the rockable work support is to successively rock the rotating work toward and away from the rotating grinding wheel in as many duplicate, complete and properly timed cycles of relieving movements of approach and recession as there are gashes or numbers of teeth in one circumference of the work, to the end that all of the teeth in a given row or convolution may be properly and identically relieved.

The rocking work table last referred to is fully described in application Serial No. 481,993, filed April 6 1943. by Harry Egleston (now Patent No. 2,379,287); only sufficient of the description will be repeated here to describe one illustrative embodiment of the present invention.

Figure 3:
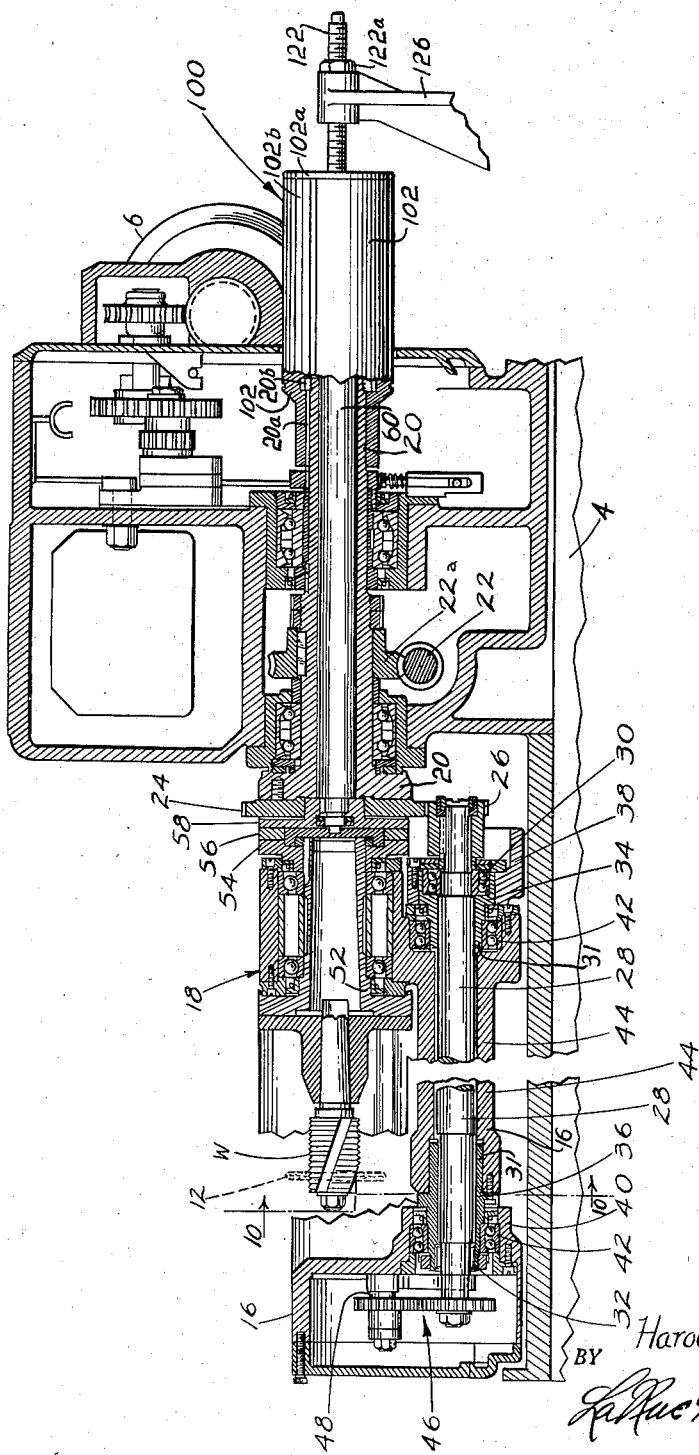
Fig. 3 is a fragmentary sectional view through the machine spindle workhead and relieving means as seen on line 3—3 of Fig. 10.

Referring to Fig. 3. the table 4 is provided with a rotatable hollow spindle 20 which may be power driven in any desired manner as by belt drive from conventional motor means (not shown) to worm shaft 22 meshing with worm wheel 22—a which is keyed to spindle 20. On the face of spindle 20 is fixed a drive gear 24 which drives gear 26 which in turn is mounted on shaft 28. The rightward end of shaft 28 is supported in the inner race of a ball bearing 30 which has its outer race supportingly surrounded by a bearing sleeve 34 which is fixed in auxiliary table 16. At its leftward end, shaft 28 is supported in needle bearing 32 which is surroundingly supported in bearing sleeve 36 fixed in frame 44. Spigot formed portions of sleeves 34 and 36 are supported in the inner races of ball bearings 42 adjacent the rightward and leftward ends of shaft 28. The outer race of the bearing 42 adjacent the leftward end of said shaft is supported in a boss 40 of auxiliary table 16, and the like numbered bearing adjacent the rightward end of the same shaft is supported in like manner in frame 44. On these ball bearings 42, the frame 44 is pivotally supported for oscillation about the center of shaft 28 as an axis thus permitting the workhead 18, which is supported by frame 44, to have its relieving movements relative to the grinding wheel 12. Shaft 28 drives a train of pick-off gears 46 which in turn drive a shaft 48 on which is mounted a relieving cam 50 which is driven at a speed which is a multiple of the speed of workhead 18. The order of this multiple is determined by the number of chip clearance gashes on the workpiece. The purpose of cam 50 is to cause one complete oscillation of approach and recession of the axis of workhead 18 toward and away from the grinding wheel 12 for each tooth on the workpiece which is presented to grinding wheel 12 in one revolution of the work W. The cam 50 is adapted, by means shown in Fig. 9, to rock the frame member 44 in one complete cycle of relieving movements per revolution of said cam.

The spindle shaft 52 of workhead 18 is formed at its inward end as a driven member 54 of a conventional Oldham coupling. The central member and driving end member thereof are numbered 56 and 58 respectively. Member 58 is keyed to shaft 60 which extends through hollow spindle 20 but is movable laterally in relation thereto for the reason that the hub of member 58 is journaled in the axial bore of gear 24. The Oldham coupling previously described, therefore, allows work spindle 52, which supports workpiece W, to be driven by shaft 60 while being continuously oscillated out of co-axial relationship therewith by the action of relieving cam 50 upon the pivotally mounted rockable frame 44. In the environmental views, Figures 9 through 11 inclusive; Fig. 9 is a fragmentary cross section through the machine table and the relieving device showing the cam 50 by which the rocking table 44 is oscillated and control means 66, fully described in aforesaid Egleston application, Serial No. 481,993, by which the amplitude of such oscillation may be adjustably predetermined.

Fig. 10 shows a section through the machine table 4, the support for the relieving means including the screw and nut means 62 by which the auxiliary table 16 of the relieving device is fastened to the machine table 4.

Fig. 11 is a fragmentary cross section through the machine table 4 and the relieving device showing control means 64 for stopping the relieving movements thereof when desired.

*Phase control device*

The present invention pertains to the means generally indicated by the number 100 by which the angular relation between shaft 60 and spindle 20 may be altered, with each change in longitudinal position of machine table 4, as required for properly relieving the teeth of a spirally gashed workpiece W.

This device includes a housing 102 which is held on hollow spindle 20 by a key 20—a and a nut 20—b for rotation therewith. The housing 102 is formed with longitudinal faces 104 into which are sunk oppositely extending ears 105 of a transverse member 106 and fastened to the housing 102 by dowels 107 and screws 107—a. This member is formed with a bore 108 co-axial with spindle 20, housing 102 and shaft 60. The shaft 60 has a stepped end of reduced diameter which is journaled in the bore 108 and is anchored against end motion therein by opposed thrust washers 110 and a pair of lock nuts 112 by which the thrust working clearance may be adjusted and locked.

To the right of nuts 112, the shaft 60 is again shouldered as at 115 and reduced in diameter to form a support 113 for a split clamped member 114 mounted thereon against the shoulder and held in position by a cap 114—a and screw 114—b.

On each of the housing faces 104 are fixed, by suitable screws, a rabbeted strip 116 forming a slideway for receiving outwardly extending ears 117 of a frame 118 which is slidable axially of housing 102. The rightward end of frame 118 is formed with a lug 118—a which is formed with an axial bore 118—b faced at its opposite ends. Through this bore a shoulder screw 120 is threaded into a tail rod 122 and locked thereto by screw 120—a. The shoulder 119 on the screw 120 and an opposed thrust washer 120—b bear respectively on opposite sides of lug 118—a and permit rotation of device 100 about the axis of the assembly without rotation of tail rod 122 though the latter is adapted to cause axial movement of frame 118 along its slideways. Frame 118 is formed with a flat face 121 to which a plate cam 124 is adjustably pivoted substantially midway of its length about a bolt 124—a and may be locked, after exact adjusted position has been determined by opposed screws 124—d, by end lock screws 124—b which traverse elongated slots 124—c.

Cam 124 has an active edge 124—e which is followed by a hardened cam follower member 114—c which is fixed in member 114. Contact between cam edge 124—e and follower 114—c is continuously urged by spring 125. Tail rod 122 is formed with an elongated running thread by which it may be longitudinally adjusted in tail bracket 126 and locked in adjusted position by nut 122—a.

Tail bracket 126 is fastened to the base 2 of the machine and, since means 100 together with its driving spindle 20 and the auxiliary table 16 carrying the workhead 18 are carried on slidable table 4, it is seen that each movement of the table causes cam follower 114—c to move along the edge 124—e of cam 124. This causes shaft 60 to experience a change in angular relation to spindle 20. As the relieving means which rocks the work W in relation to the grinding wheel 12 is actuated by spindle 20 through means previously described and the workhead 18 is driven through the angular change device 100, it may be seen that each axial movement of table 4 will make a predetermined change of angular relation between the work W and the movement of the relieving means. The magnitude of this angular change per unit of table movement may be altered by altering the adjustment of cam 124 or by substituting therefor cams having different inclinations of their faces 124—e with respect to the axis of housing 102.

The adjustment of tail rod 122 in bracket 126 makes possible the proper coincidence of the maximum separation of work axis and grinding wheel axis in setting up the machine so that, in their cyclical relieving movements, the cutting edge of the tooth may be ground to a larger diameter than any portion of the tooth which trails the cutting edge.

For purposes of appearance and protection from abrasive grit, housing 102 is provided with an end closure cover 102—a and a face closure 102—b.

Summarizing the operations pertaining to the angular change means in the grinding of no lead spirally gashed thread milling hobs: The work W is mounted for rotation by the workhead 18; the cam 124 is adjusted to correspond to the helix angle of the spiral gashes in the work W, the tail rod 122 is adjusted in its bracket to bring the high point of the tooth diameter in desired coincidence with the cutting edge of the tooth. After the making of the foregoing adjustments, no further attention need be given the angular changing means as each axial movement of the machine table 4 will cause the required angular change between relieving means and work rotating means.

While the present invention is illustratively shown in connection with the grinding of no lead thread milling hobs, it is to be understood that it is adapted for use in the grinding of spirally gashed taps and similar lead threads if desired. In fact the invention is susceptible to many modifications and alternative constructions and the scope thereof is defined by the appended claims.

I claim as my invention:

1. In a machine for cutting relieved tooth convolutions on the periphery of a thread milling hob having spiral tooth face gashes, in combination, a base, a table translatable thereon, a cutter operatively supported on said base, a rotatable workhead mounted on said table for rotatively supporting the hob in operative association with the cutter, means for rotating the workhead, tooth relieving means operatively connected to said first mentioned means for effecting relative approach and receding movements between said cutter and said workhead to alter the radial distance from the cutter to the axis of the hob in a succession of relative tooth relieving movements between said cutter and said workhead in timed relation with the rotation of the workhead, main power input means including a hollow shaft rotatably supported on said table, means for driving said shaft, means at one end of said shaft for driving the tooth relieving means, a housing fixed to the opposite end of said hollow shaft for rotation therewith, a frame rotatably driven by said housing and axially slidable therewithin, a tail rod journaled at one end thereof to said frame and anchored to said base adjacent its opposite end to cause said frame to move relatively axially of said housing upon translation of said table, an edge plate cam adjustably fixed to said frame, an inner shaft extending through said hollow shaft and into said housing, a cam follower fixed to the end of said shaft within said housing and engaging the edge of said cam to rotationally drive said inner shaft upon rotation of said outer shaft, coupling means intermediate the opposite end of said inner shaft and the workhead to drive said workhead from said inner shaft, and means for adjustably positioning said plate cam on said frame to change the effectiveness of said cam to alter the timed relation of the work rotating and the relieving movements responsive to translation of said table.

2. A power transmission mechanism including in combination, a support, a power input shaft, a power output shaft, one of said shafts being concentrically disposed within the other throughout a portion of its length and being angularly oscillatable therewithin, a bearing carried by said support, said shafts being rotatable in said bearing, a housing fixed to one end of the outer shaft for rotation therewith, a member rotationally driven by the housing and movable axially thereof, tail shaft means coaxial with said shafts and journaled to said member to effect relative movement of the same axially of said housing, an edge plate cam adjustably fastened to said member, a portion of said inner shaft extended within said housing and having fixed thereto a cam follower to engage the edge of the plate cam when said member is relatively moved axially of said housing, spring means urging said follower into engagement with said cam, and means for altering the adjustment of said cam on said member to alter the effectiveness of said cam in causing relative angular movement between said two first mentioned shafts upon relative movement of said member axially of said housing.

3. Means for altering the timed relation of a rotationally driven device relative to a driving device associated therewith including, in combination, a support, bearings on the support, a pair of shafts rotatable in said bearings, a member fixed to one of said shafts having a slideway formed therein, a member slidable on said slideway and having a cam surface, means for effecting relative movement of said slidable member along said slideway, a member fixed to the other of said shafts and having a cam follower fixed thereto for relative traverse along the cam surface when the slidable member is moved relatively along said slideway, said cam and cam follower being effective upon relative movement therebetween to alter the angular position of one of said shafts relative to the other, a connection joining the driving device to one of the shafts and a connection joining the driven device to the other shaft of said pair.

4. In a machine for cutting relieved tooth convolutions on the periphery of a thread milling hob having spiral tooth face gashes, in combination, a base, a table rectilinearly translatable in a predetermined direction, a cutter mounted on said base, a workhead having a rotary spindle disposed parallel to the direction of table translation and adapted to support said hob, said workhead being mounted on said table for translation therewith and for relieving reciprocation transversely of said spindle toward and from said cutter, a relieving cam operable to impart said relieving reciprocation to said workhead, and power transmission means having a driving shaft operatively connected through two parallel branch transmissions respectively for driving said spindle and said cam in timed relation whereby to obtain one relieving reciprocation for each tooth of a tooth convolution of said hob, one branch transmission including a driven shaft coaxial with said first shaft, said shafts being supported on said table for axial movement therewith, a cam mounted on said driving shaft for rotation therewith and for relative sliding movement axially thereof and having a cam face extending generally longitudinally of the shaft axis and being selectively adjustable into various angular relations to said axis, a cam follower connected to said driven shaft for rotation and translation therewith, said follower slidably engaging said cam face and establishing a rotary driving connection between said shafts, and means adjustably connecting said cam to said base to constrain said cam against movement with said driving shaft upon translation of said table.

5. In means for rotatively cutting parallel circumferential convolutions on the periphery of a thread milling hob having spiral tooth face gashes, rotary convolution cutting means, means for supporting and rotating the hob, means automatically and cyclically operable in timed relation to the rotation of said hob supporting and rotating means to effect relative movement between said cutting means and said hob supporting and rotating means transversely of the hob axis so as to alter the distance of lateral separation of the hob and the convolution cutting means in a succession of tooth relieving movements during a convolution cutting period, manually actuated means for axially moving the hob supporting and rotating means relative to the cutting means in a succession of step by step indexing movements intermediate successive convolution cutting periods, and slide cam and cam follower means adjustable in accordance with the helix angle of said spiral gashes and automatically operable in response and in timed relation to said axial movements of the hob supporting and rotating means relative to the cutting means to alter the angular relation between the rotative relation of the hob supporting and rotating means and the means for effecting said cyclical relieving movements.

6. A power transmission mechanism including in combination, a support, a power input shaft, a power output shaft coaxial with said input shaft and coextensive therewith throughout a portion of their lengths, a bearing on said support, said shafts being rotatable in said bearing, a bearing permitting angular movement of said shafts relative to each other, a housing fixed on one of said shafts for rotation and axial movement therewith, a frame rotatable with said housing and relatively axially movable therewithin, tail shaft means connected to said frame to constrain the same against axial movement with said housing, a plate cam adjustably fastened to said frame, a cam follower fixed to the other of the said two first mentioned shafts and positioned within said housing for longitudinal movement relative to the edge of said cam when said housing is moved axially relatively to said frame, and means for altering the adjustment of said cam on said frame to alter the effectiveness of said cam in causing relative angular movement between said two first mentioned shafts upon relative movement of said frame in said housing.

HAROLD N. SEYFERTH.

REFERENCES CITED

The following references are of record in the file of this patent:

UNITED STATES PATENTS

| Number | Name | Date |
| --- | --- | --- |
| 1,027,644 | Diemer | May 28, 1912 |
| 1,629,252 | Bouza | May 17, 1927 |
| 1,640,994 | Hanson | Aug. 30, 1927 |
| 1,835,476 | Drader | Dec. 8, 1931 |
| 1,983,286 | Godziewski | Dec. 4, 1934 |
| 2,057,354 | Withers et al. | Oct. 13, 1936 |
| 2,079,785 | Ackley | May 11, 1937 |
| 2,190,900 | Von Tavel | Feb. 20, 1940 |
| 2,227,715 | Horstmann | Jan. 7, 1941 |